United States Patent [19] [11] 4,122,500
Bradford et al. [45] Oct. 24, 1978

[54] COMPILING DEVICE WITH MANUALLY VARIED AUTOMATIC LOCATION DETERMINATION

[75] Inventors: Robert S. Bradford, Woodland Hills; Richard D. Ebbinga, Camarillo, both of Calif.

[73] Assignee: Minnesota Mining and Manufacturing Company, St. Paul, Minn.

[21] Appl. No.: 776,586

[22] Filed: Mar. 11, 1977

[51] Int. Cl.² ............................................. G11B 27/02
[52] U.S. Cl. ......................................................... 360/13
[58] Field of Search ..................................... 360/15, 13

[56] References Cited
U.S. PATENT DOCUMENTS

| | | | |
|---|---|---|---|
| 2,611,828 | 9/1952 | Gunby | 360/13 |
| 3,031,534 | 4/1962 | Trumble | 360/13 |
| 3,152,227 | 10/1964 | Durio | 360/13 |

Primary Examiner—Robert S. Tupper
Attorney, Agent, or Firm—Cruzan Alexander; Donald M. Sell; William L. Huebsch

[57] ABSTRACT

A device for recording portions of the signals on the tape in one or more master cassettes in a desired sequence on the tape in a copy cassette. The device includes two cassette stations each including an electronically operated drive mechanism for driving the tape in a cassette at the station in either a forward or reverse direction past a record and playback head. Each station includes means for cycling the drive mechanism between forward and reverse to repetitively play a short segment of the tape in a cassette at the station, and a manually operated control for incrementally changing the segment of the tape played in each repeat cycle. By these controls an operator selects a segment of the tape in a cassette on which signals are to be copied, which segment has an end point at which signals to be added to the tape should start, and selects a segment of a tape in a master cassette from which signals are to be copied which segment has the same beginning point as the signals to be copied. Means are provided for then recording the signals from the master tape onto the copy tape with the signals at the beginning point on the master tape being recorded essentially at the end point on the copy tape.

8 Claims, 8 Drawing Figures

COMPILING DEVICE WITH MANUALLY VARIED AUTOMATIC LOCATION DETERMINATION

BACKGROUND OF THE INVENTION

This invention relates to devices for compiling information from one or more tape in a desired sequence on a single tape, and particularly such a device affording such compilation from one or more lengths of magnetic recording tape.

Preparing an audio program commonly requires selecting portions of one or more lengths of prerecorded tape and compiling those portions as a single length of recorded tape to be used in presenting the program.

A common method for such compilation used with reel to reel type tape recorders is to physically cut the desired portions from the prerecorded tape or tapes and splice the portions in a desired sequence. The disposure of the playback head on reel to reel recorders affords access to the tape adjacent the playback head, and those skilled in the art have developed methods including manual manipulation of tape across the head whereby the tape may be accurately marked, severed and spliced so that proper continuity is provided between the portions of the spliced tape.

An alternate method for such compilation which does not require splicing of tape has included the use of two reel to reel tape recorders. Ends of the portions of tape to be compiled are marked via the means used in the splicing method mentioned above. The beginning of a portion of a copy tape on which signals are to be recorded is then located at a record head of one machine, and the beginning of a length of a master tape is to be copied is located at a playback head of a second machine. The machines are simultaneously started with the first in a record mode, the second in a playback mode, and the machines properly connected to record the signals on the master tape in a predetermined location along the copy tape.

Known cassette recorder and playback devices do not afford sufficient access to the heads and reels to allow the use of such techniques, however. Compilation systems for cassettes have been developed in which a code is recorded along the cassette tape and then used to electronically determine the appropriate beginning and ending points along a tape for such transfers. These systems, however, require either a separate step to record the code on cassettes or the use of special precoded cassettes and thus are not as convenient as may be desired.

Thus, information initially recorded on cassettes has sometimes been copied on a reel to reel type tape recorder so that compilation may be done by one of the procedures indicated above for reel to reel type recorders.

SUMMARY OF THE INVENTION

The present invention affords compilation of portions of information recorded on one or more lengths of tape onto a single tape which can be used for such compilation between standard tape cassettes without the addition of a timing code, and which compilation may be done with more flexibility and accuracy than has heretofore been possible with procedures similar to those described above for reel to reel recorders.

The present invention is a device having two stations, each adapted to support a supply of recording tape (such as the magnetic recording tape in a standard cassette) and having an electronically operated drive mechanism adapted to drive the tape in either direction past a playback head. Additionally each station includes means for automatically and repetitively cycling the drive mechanism between forward and reverse to repetitively play a short segment of the tape at the station, and manually operated means for affording incremental changes in the segment of the tape played in each repeat cycle. This allows an operator to select a segment of a copy tape on which signals are to be copied with which has an end point for the segment corresponding to the point at which signals to be added to the tape should start, and to select a segment of a master tape from which signals are being copied with a beginning point for the segment corresponding to the beginning point of the signals to be copied. Means are provided for then recording the signals from the master tape on the copy tape with the signals at the beginning point of the segment on the master tape being recorded essentially at the end point of the segment on the copy tape.

Preferably, the device also includes control means for sequentially playing first the segment of the copy tape and then the segment of the master tape with the timing that will be produced when the signals from the master tape are recorded on the copy tape via the recording means so that final adjustments may be made in the continuity between the segments by manipulation of the manually operated means.

The means for cycling the drive mechanism comprises means for producing a marking signal as each of two specific spaced locations along the tape pass the head in either direction during operation of the drive mechanism, and a control circuit for cycling the drive between forward and reverse direction upon receipt of the marking signals. Such a means for producing a marking signal could be coupled to any one of several members driven by or incorporated in the drive mechanism, such as a shaft coupled to a tape support spool or a pair of nip rollers constantly in engagement with and driven by movement of the tape. In the embodiment of the device disclosed herein for use with standard cassettes, the means for producing a signal is coupled to a shaft which engages and rotates with the tape supply spool in the cassette. Repetitive rotation of the tape supply spool through a relatively small angle (e.g. 360°) in first the forward and then the reverse direction moves the same short segment of tape back and forth past the head with sufficient accuracy for operation of the device, and the playing time for the segment is sufficiently long (e.g. about 1.4 to 3.3 seconds in duration) so that the operator can easily identify the segment he has selected along the tape.

The manually operated means for affording incremental changes in the segment of the tape played in each repeat cycle comprises means for incrementally changing the timing of the spaced marking signals with respect to the drive mechanism so that the segment of the tape that passes the head between signals can be incrementally changed in position in either direction along the tape.

In the embodiment of the device disclosed herein, the means for providing the signal comprises a normally fixed signal member mounted around the shaft coupled to the supply spool and a rotating signal member fixed on the shaft coupled to the supply spool. A marking signal is produced when a portion of the rotating signal member is aligned with a portion of the fixed signal member which occurs once in each 360° rotation of the rotating signal member. Thus a signal is produced at each end of a 360° rotation of the shaft beginning with alignment of the signal portions. The normally fixed signal member is rotatable in either direction around the shaft via a manually operated control to change the angular position of the rotatable member at which the signal portions are aligned, and thereby change the segment of the tape which passes the heads between signals in either direction along the tape.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
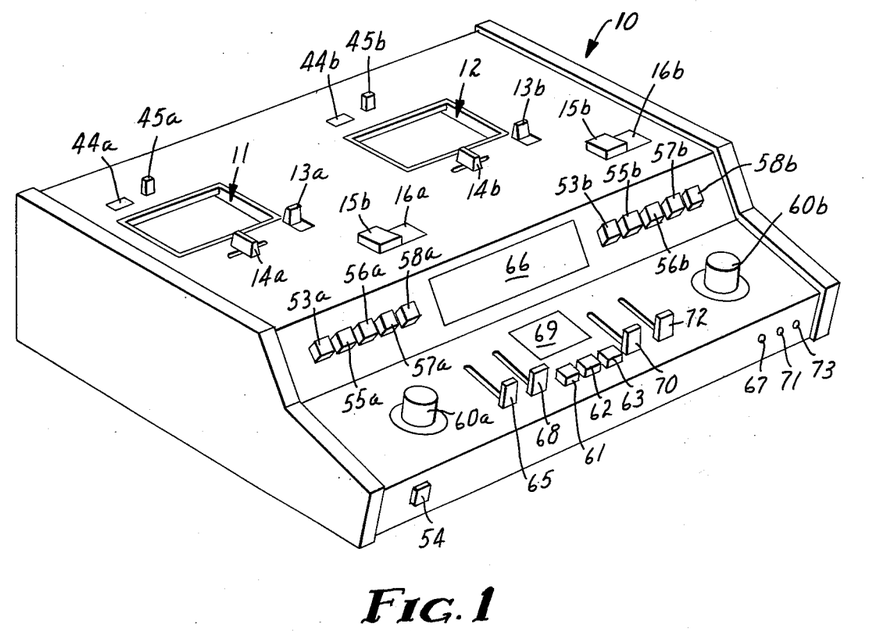
FIG. 1 is a schematic view of a device according to the present invention.

Referring now to FIG. 1 of the drawing there is illustrated a device according to the present invention generally designated by the numeral 10.

The device 10 includes means for defining a first or master cassette station 11 for receiving a conventional cassette from which a portion or portions are to be copied, and a second or copy cassette station 12 in which can be inserted a conventional cassette on which the portion or portions are to be recorded. Both stations are similar and the structures thereof will be explained together with reference numerals referring to the master station 11 being designated by the suffix "a" and reference numerals referring to the copy station 12 being designated by the suffix "b" where portions of both stations are shown in one view on the drawing.

Figures 2, 4:
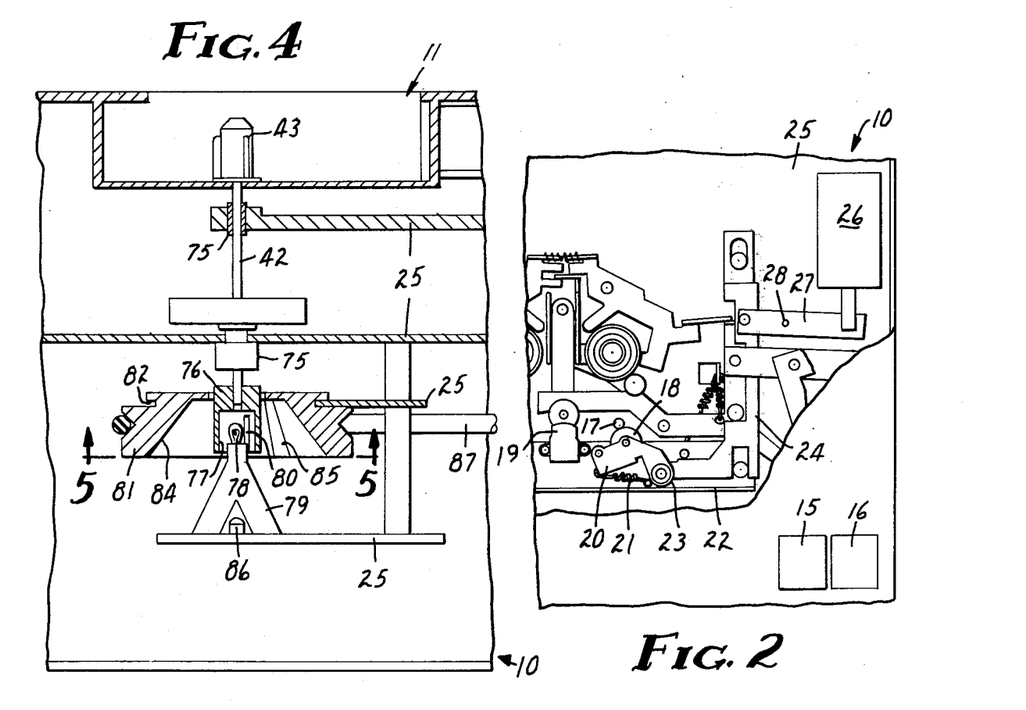
FIG. 2 is a fragmentary plan view of one of a pair of stations for receiving cassettes in the device of FIG. 1.
FIG. 4 is a fragmentary sectional view taken approximately along line 4—4 of FIG. 3.

The cassettes at both stations 11 and 12 are received in a recess wherein the cassette is retained by a retaining mechanism releasable via a lever 13a or 13b. Each station includes a known fast forward or reverse mechanism which is manually operable via a lever 14a or 14b to cause fast forward or reverse winding of a tape at the station 11 or 12, and a tape engage mechanism activated by an engage button 15a or 15b and released by a release button 16a or 16b. As is best seen in FIG. 2, the tape engage mechanism when activated can engage tape in the cassette between a capstan 17 and a pressure roller 18 and presses a play record head 19 against the tape in the cassette so that rotation of the capstan 17 will drive the tape past the head 19 to play the tape or have material recorded thereon. The retaining mechanism, the manually operated fast forward or reverse tape drive mechanism and the tape engage mechanisms are not illustrated or explained in detail herein, but are essentially the same as the mechanisms disclosed in U.S. Pat. No. 3,542,312, the disclosure of which is incorporated herein by reference. The mechanism described in U.S. Pat. No. 3,542,312 has, however, been modified in two respects. First instead of limiting movement of the pressure roller 18 and a frame 20 on which the pressure roller 18 is mounted toward the capstan 17 under the influence of a spring 21 by positioning a pin fixed to a slidable bar 22 on which the frame 20 is pivotably mounted in an opening 23 in the frame 20, there is instead provided a slide member 24 having an end engaged in the opening 23 which slide member 24 is mounted on the bar 22 for sliding movement relative thereto. The slide member 24 is slidable between a position at which (when the tape engage mechanism is activated), the pressure roller 18 is allowed to press the tape against the capstan 17, and a separate position at which the pressure roller 18 is separated slightly from the capstan 17 to afford movement of tape therebetween even when the tape engage mechanism is activated. This slide member 24 is operated through a link 27 pivotably mounted at a pin 28 on a frame 25 for the device 10 by a pause solenoid 26. The solenoid 26, when activated, will move the slide member 24 to its separate position.

The second modification is that there is added an electronically activated means for rewinding the tape onto the supply spool of the cassette even when the tape engage mechanism is activated, which means for rewinding is slower but thus has higher torque than the rewind mechanism operatable by the lever 14a or 14b. This means, best seen in FIG. 3, comprises a pivot frame 29 pivotably mounted on the frame 25 at a pin 30 and rotatably supporting a pulley 31 at one end. An O-ring belt 32 extends around the pulley 31 and is driven by a pulley 33 fixed on a shaft 34 coaxial with and fixed to the capstan 17. As is shown in U.S. Pat. No. 3,542,312 the shaft 34 can be driven by activation of a motor 35 through a drive train including a drive pulley 36, idler pulley 38 and a flywheel 39 also fixed to the shaft 34. The pivot frame 29 is pivotable by activation of a rewind solenoid 37 against the bias of a spring 40 from a disengaged position at which the belt 32 on the pulley 31 is out of driving engagement, to an engaged position at which the belt 32 on the pulley 29 is in frictional driving engagement with the periphery of a pulley 41 coupled through a friction clutch to a shaft 42 having an end 43 (FIG. 4) adapted to engage and turn with the supply spool of a cassette at the station 11 or 12.

Each of the stations 11 and 12 also include a known type of counter driven by movement of the shaft 42, which counter is visible at a window 44a, 44b and is resettable by a push button 45a, 45b.

For each station 11 or 12 on the device there is provided a series of control push switches. One of the switches is a play switch 53a or 53b which, when depressed (after the device 10 is activated via an on-off switch 54 on the front panel and the tape engage mechanism is engaged via the engage button 15a or 15b) activates means for playing a cassette in a conventional manner. Another of the switches select or test switch 55a or 55b which when depressed to a releasable engaged position activates means for automatically and repetitively replaying a short segment of the tape at the station 11 or 12, which segment will include the portion of the tape that was at the head when the test switch 55a or 55b was engaged. For each of the stations 11 and 12 there is also provided a cue switch 56a or 56b which for the master station 11 activates means for stopping the tape in the station 11 at the beginning of the segment repeated by engaging the test switch 55a, and for the copy station 12 activates means for stopping the tape in the station 12 at the end of the segment repeated by engaging the test switch 55b; and back space and forward space switches 57a or 57b and 58a or 58b which respectively activate means for changing the segment being played via activation of the test switch 55a or 55b to a segment just preceding or just following the segment originally being played. The play, test and cue switches 53, 55, 56 for each station 11 or 12 are mechanically interlocked so that only one can be engaged, whereas the back and forward space switches 57 and 58 are momentary contact switches which will operate when either the test or cue switches 55 or 56 are activated.

A rotatable knob 60a or 60b is also provided for each station. The knob 60a or 60b when rotated in either the clockwise or counterclockwise direction will correspondingly change the segment of the tape played in either the forward or reverse direction along the length of the tape at that station when the test switch 55a or 55b is activated so that a segment of the tape having a desired beginning or ending point may be selected by the operator.

At the center of the device 10 are three push activated switches which are mechanically interlocked to insure that only one of the three switches can be depressed at one time. The three switches include a check switch 61 which when pressed to a releasably engaged position after segments of tape at both the master and copy tape stations 11 and 12 have been selected and both of the cue switches 56a and 56b are depressed, will activate means for repeatedly playing first the segment at the copy station 12 and then the segment at the master station 11 so that the operator may hear the spacing therebetween that will occur after a composite recording is made, and have the opportunity by rotation of either of the knobs 60a or 60b to change the relationship therebetween for a desired continuity. Another of the three switches is a record switch 62 which, when pressed, will activate means for recording the segment and subsequent position of the tape in the cassette at the master station 11 on the tape in the cassette at the copy station 12 beginning at the end of the segment on the tape at the copy station 12. Also, provided is a stop switch 63 which when pressed will disengage either the check switch 61 or the record switch 62.

Also provided on the device 10 are a volume slide control 65 for the playback volume of the device heard through a speaker 66, or alternatively through head phones (not shown) which can be connected at a jack 67; a record level slide control 68 which controls the recording level on the tape at the copy station 12 as is indicated on a VU meter 69; an input level slide control 70 for a microphone (not shown) which microphone may be connected at a jack 71 and used to record on the cassette at the copy station 12 in a conventional manner, and an auxilliary input level slide control 72 for adjusting a high level input as from a radio or external tape playback device (not shown) coupled to the device at an input jack 73.

The means in the device for (1) repetitively playing a short segment of the tape in a cassette in either station 11 or 12 by activating the test switch 55a or 55b; (2) for incrementally changing the segment being played at one of the stations 11 or 12 by rotating the knob 60a or 60b; (3) for changing the segment being played at either of the stations to a segment just before or after the segment initially selected by activating the back space or forward space switches 57a, 57b, 58a or 58b; (4) for stopping the tape at the master station 12 at the beginning of the segment selected by engaging the cue switch 56a; (5) for stopping the tape at the copy station at the end of the segment selected by engaging the cue switch 56b; (6) for testing the continuity of the material to be recorded on the tape at the copy station with that previously recorded by engaging the check switch 61; and (7) for affording recording of the signals on the tape at the copy station with the material at the beginning of the segment at the master station 11 being recorded essentially at the end of the segment selected at the copy station 12 are all dependent for their operation on (1) signal means at each station for producing a marking signal as each of two specific spaced locations along the tape pass the head 19 in either the forward or the reverse direction; (2) means for affording manual adjustment of the timing of the spaced marking signals with respect to the drive means so that the segment that passes the head between signals will be incrementally changed in location along the tape; and (3) a logic control circuit portions of which are manually activated via the switches 55, 56, 57, 58 and 61 and are responsive to the signals for producing the results indicated.

Figure 3:
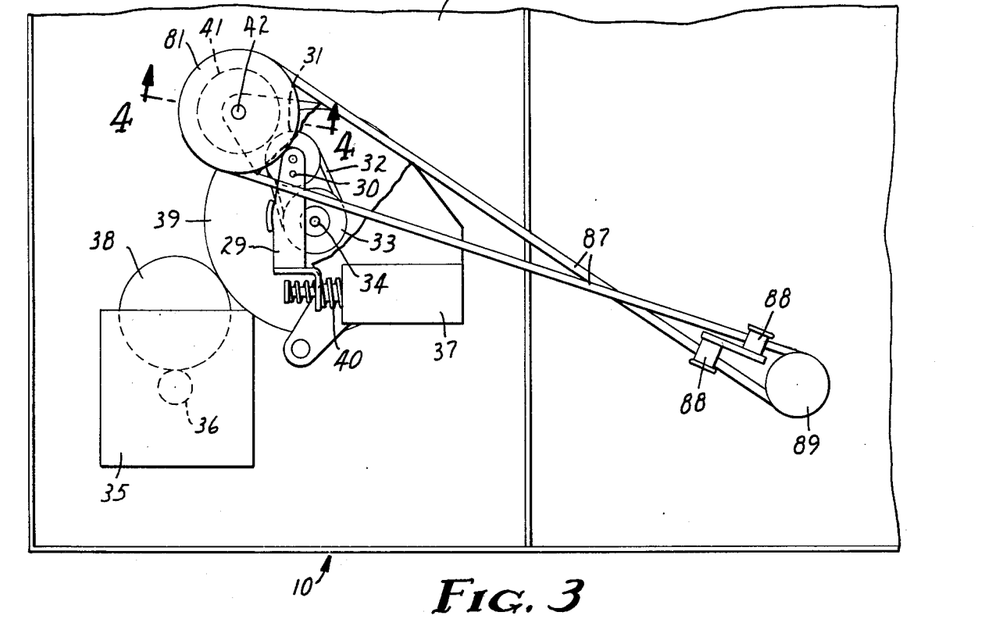
FIG. 3 is a fragmentary bottom view of the station of FIG. 2.

The means for producing the signals and the means for affording manual adjustment of the timing are similar for both stations 11 and 12, and these means for one of the stations are illustrated in FIGS. 3 and 4. Referring now to FIG. 4, there is shown the shaft 42 which is supported via two bearings 75 on the frame 25 for the device 10. A rotating signal member or cylindrical housing 76 is fixed to the end of the shaft 42 opposite its end 43 adapted to engage the supply spool in a cassette. The housing 76 has a cylindrical cavity 77 coaxial with the shaft 42 and housing 76 and communicating through the end of the housing 76 opposite the shaft 42. A light source or bulb 78 is supported within the cavity 77 on a transparent support 79 (e.g. of transparent plastic) mounted on the frame 25. The upper surface of the support 79 has an opaque coating (e.g. black paint) to keep light from the bulb 78 from escaping through the support 79. The housing wall has an axially extending through slot 80 which, as the housing 76 rotates with a supply spool in a cassette, will allow light to shine axially of the housing 76 and repetitively sweep a 360° arc. A pulley-like normally fixed reflecting signal member 81 is mounted on the frame 25 at a bearing slot 82 which affords coaxial rotation of the reflecting member 81 about the housing 76. The reflecting member 81 has a frusto-conical inner surface 84 axially aligned with the slot 80 in the housing 76. The inner surface 84 is generally nonreflective except for an axially extending specularly reflective strip 85. The strip 85 is inclined to reflect light passing through the slot 80 to a light sensor 86 at the base of the transparent support 79 and cause the light sensor 86 to emit a signal when the slot 80 is aligned with the reflective strip 85. Thus the rotating signal member 76 cooperates with the normally fixed signal member 81 to produce a signal at each end of a 360° rotation of the shaft 42 which rotation begins with alignment between portions thereof, namely the slot 80 and strip 85.

The means for affording manual adjustment of the timing of the spaced signals with respect to the drive means comprises a belt 87 in driving engagement in a V-groove about the periphery of the normally fixed reflecting member 81. The belt 87 is guided over guide rollers 88 (FIG. 3) and driven by a pulley 89 coupled to the knob 60a or 60b which may be manually rotated to change the segment of the tape that passes the head 19 between two successive signals.

Figure 5:
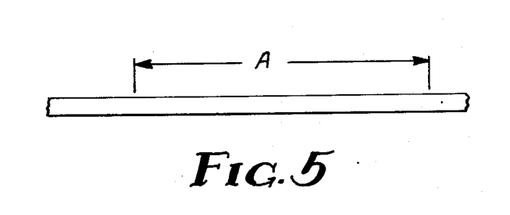
FIGS. 5 and 6 are fragmentary sectional views taken approximately along line 5—5 of FIG. 4, which illustrate the effect upon a segment of tape passing the head of manually adjusting a means for producing a marking signal in the device.
Figure 6:
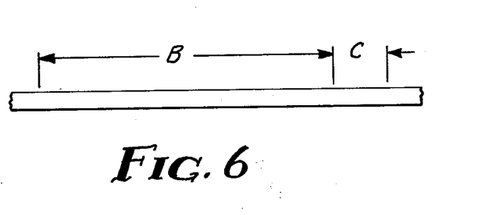

As is illustrated in FIGS. 5 and 6, rotation of the normally fixed reflecting member 81 via the knob 60a or 60b will change the segment of the tape in a cassette which passes the head 19 at the station 11 or 12 between signals from the sensor 86. Assuming the reflecting member 81 is initially positioned as illustrated in FIG. 5, a segment of tape A corresponding in length to one wrap of tape on the supply spool in a cassette in the station 11 or 12 will pass the head 19 at the station 11 or 12 between signals from the sensor 86. Should the reflecting member 81 be then rotated through an angle D of less than 360° via the knob 60a or 60b to a new position as illustrated in FIG. 6, however, a new segment of tape B will pass the head 19 between signals which new segment B will include some of the original segment A, but will have end points shifted along the length of the tape by a distance C bearing roughly the same proportion to the length of the original Segment A as the degrees of rotation D of the reflecting member 81 bears to 360°. Such shifts allow an operator to manually select a segment of the tape having a desired end or beginning point to provide a desired continuity between the material already on the tape at the copy station 12 and the material being added thereto from the tape at the master station 11.

The logic circuits for providing the various functions described above are illustrated in FIGS. 7 and 8 and will now be functionally described with reference thereto.

Figure 7:
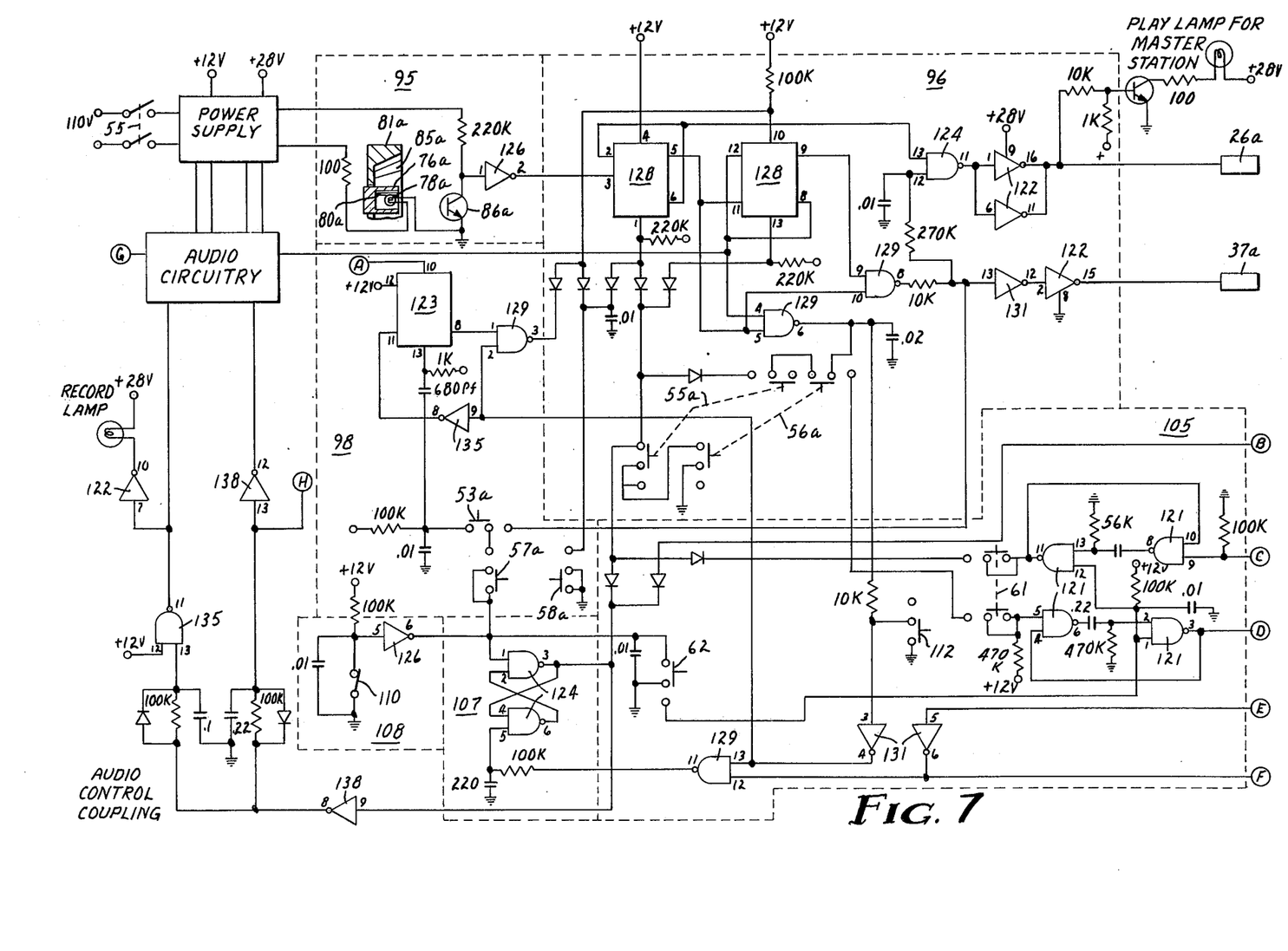
FIGS. 7 and 8 are each fragmentary schematic views, which together illustrate a control circuit for the device.

Starting with FIG. 7, which primarily illustrates circuitry for the master station 11, there is illustrated a signal portion 95 of the circuitry generally bounded by dotted lines and including the light 78a, the slotted housing 76a and the sensor 86a which provide signals upon revolution of the supply spool in a cassette at the master station 11 as described above. Such signals are received by a counter portion 96 of the circuitry also generally bounded by dotted lines. The counter portion 96 of the circuitry is grounded through the test and cue switches 55a and 56a when they are disengaged (the position illustrated), thus maintaining a zero count in the counter portion 96. Thus the play switch 53a may be engaged to play the cassette at the master station 11 in a normal manner through conventional circuits (not shown) without causing signals from the signal portion 95 to affect the counter portion 96 of the circuit. When in the course of such play, however, it is desired to select a segment of the tape with the proper beginning point for a portion of the tape to be recorded on the tape at the copy station 12, the operator depresses the test switch 55a. This breaks the ground in the counter portion 96 of the circuitry so that when the next signal is received from the signal portion 95 a negative 3 is stored in the counter portion 96 and the pause solenoid 26a and rewind solenoid 37a at the master station 11 are activated to rewind the tape onto the supply spool. The rewinding continues until the next signal is received from the signal portion 95 after a 360° rewind of the supply spool. This sets a negative 2 in the counter portion 96, and deactivates the pause solenoid 26a and rewind solenoid 37a so that the tape is again driven in a forward direction and played. The device can switch from forward drive to rewind before the slot 80 moves out of alignment with the reflective strip 85 (which occurs over an angle of about 15°). Because of the relative fast speed of rewind compared to forward play, however, the slot 80 in the housing 78 will pass the reflective strip 85 before the drive mechanism can shift from rewind to forward drive. Thus, slight forward movement of the drive will cause a marking signal which occurs when the slot 80 and strip 85 are again in alignment as the beginning point of the segment passes the head 19. This marking signal causes a negative 1 to be set in the counter portion 96, which, when the test switch 55a is depressed, is automatically changed by the circuitry to a zero count and thus allows the drive to play the tape until the signal corresponding to the end of the segment is received from the signal portion 95. This signal again sets the counter to a negative 3 to repeat the cycle described above. Thus a short segment of the tape corresponding to about one wrap on the supply spool is repeatedly played, and may be incrementally changed by manipulating the knob 60a for the master station 11 so that the operator can select a precise beginning point for the segment along the cassette tape at the master station 11.

After the operator has selected the beginning point for the segment he can depress the cue switch 56a for the master station 11 to stop the segment of tape with its beginning point at the playback head 19 at the master station 11. Depressing of the cue switch 56a releases the test switch 55a via a mechanical interlock therebetween, but causes the cycle activated by the test switch 55a to continue (or to begin if the test switch 55a has not been previously activated) until the counter is set to a negative 1 when the signal corresponding to the beginning point of the segment is received. The counter portion 96 of the circuitry will not automatically reset the counter from a negative one to zero when the cue switch 56a is activated but when the counter portion 96 is set to minus one will instead activate the pause solenoid 26a to stop the motion of the tape with the beginning point of the segment at the playback head 19.

A spacing portion 98 of the circuitry, also generally enclosed by dotted lines, provides the means for back spacing and for forward spacing to change the beginning point of the segment repetitively played when the test switch 55a is pressed by approximately one segment length in either a forward or reverse direction along the cassette tape, as may be desired if the segment initially selected does not contain the desired beginning point for the material to be recorded from the cassette in the station 11. After the back space switch 57a is momentarily activated, the next time the counter portion 96 of the circuitry is set at a count of minus one (or immediately if the counter portion 96 of the circuitry is already set at a minus one) the spacing portion 98 of the circuitry changes the count to a negative 3. This causes the tape deck to rewind until the next signal is received from the signal portion 95 to change the count in the counter portion 96 to minus 2 to again drive the tape in a forward direction, which will only occur after the take-up spool has been rewound by one full revolution.

When the forward space switch 58a is momentarily activated, the spacing portion 98 of the circuitry sets a negative 2 in the counter portion 96 of the circuitry causing it to play forward for one more revolution of the supply spool at the master station 11, whereupon one of the above described cycles is completed depending on whether the test or cue switch 55a or 56a is engaged.

Figure 8:
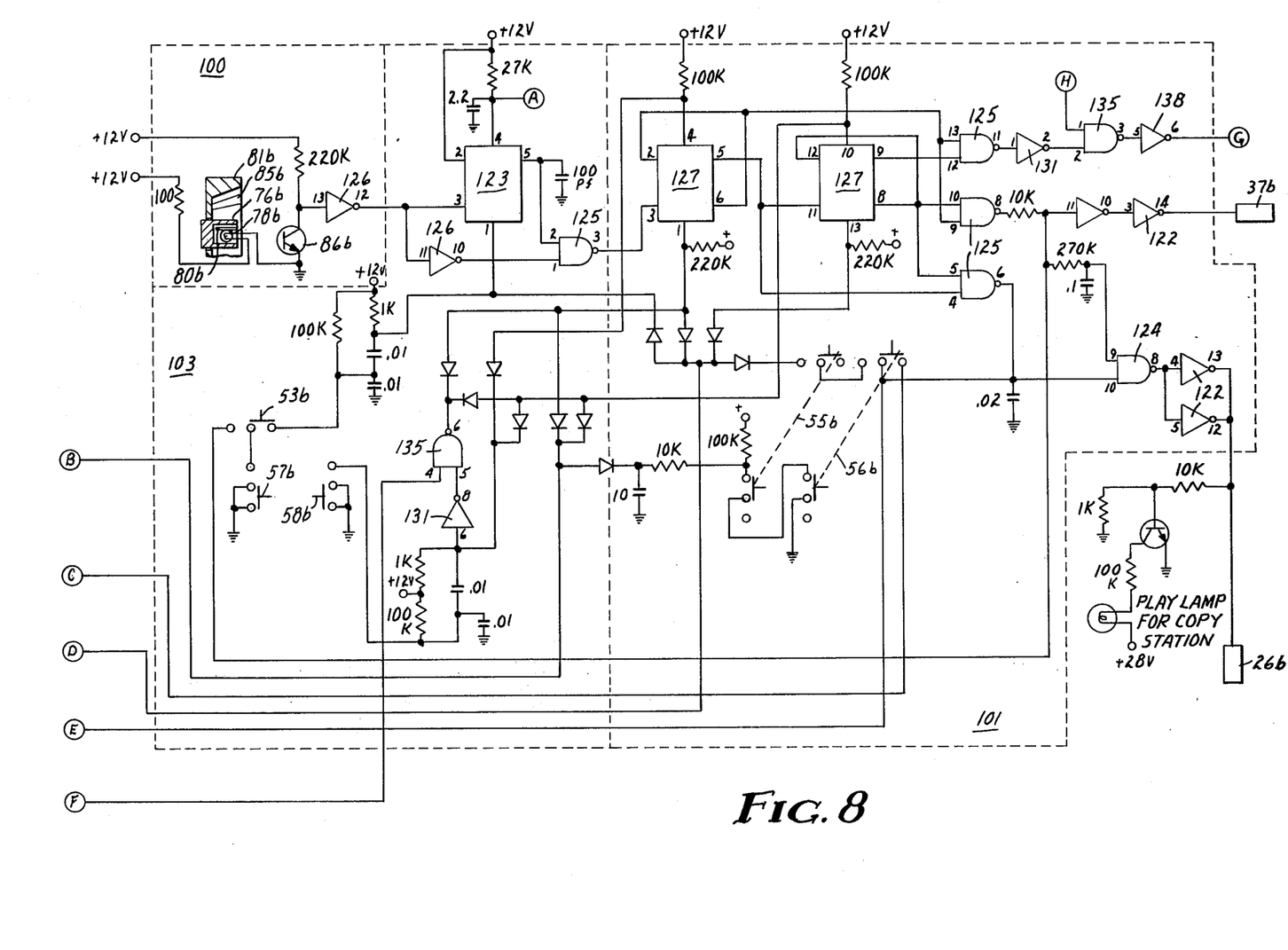

Most of the logic circuitry for the copy station 12 is seen in FIG. 8. This circuitry is similar to that for the master station 11, and similarly includes a signal portion 100 of the circuitry enclosed by a dotted line which includes the light 78b, reflecting member 81b and sensor 86b for the second station 12; and a counter portion 101 of the circuitry also generally enclosed by a dotted line. The counter portion 101 of the circuitry for the copy station 12 differs from the counter portion 96 of the circuitry for the master station 11 in that when the play switch 53b for the copy station 12 is engaged, the counter portion 101 is maintained at a count of minus 2. After the test or cue switches 55b or 56b are engaged, the next signal received from the signal portion 100 of the circuitry changes the count in the counter portion 101 to a negative 1, which count, when the test switch 55b is engaged, is automatically reset to zero by the counter portion 101. When the counter portion 101 is set to zero it activates the pause solenoid 26b and rewind solenoid 37b for the copy station 12 so that the tape is rewound on the supply spool until the next signal is received from the signal portion 100. When that signal is received, it sets a negative 3 in the counter portion 101 and deactivates the pause and rewind solenoids 26b and 37b so that the tape at the copy station 12 is again played in a forward direction. The relatively rapid rewind causes the housing 76b to rotate past the point of alignment between the slot 80b in the housing 76b and the reflective strip 85b so that another signal is given by the signal portion 100 as the beginning point of the tape segment passes the head 19. This signal sets the counter portion 101 to a negative 2 which causes the tape to be played in a forward direction until the signal portion 100 of the circuitry again provides a signal corresponding to the end point of the segment. When that signal is received a negative 1 is again set in the counter portion 101 and the cycle repeats as described above to repetitively play the segment. If the cue switch 56b for the copy station 12 is engaged, the circuitry will not automatically reset a count of a negative 1 to zero, and the cycle will be interrupted with the end of the selected segment at the record playback head 19.

The circuitry also includes a back space and forward spacing portion 103 for the copy station 12 which is generally enclosed by dotted lines and which performs the same function as the spacing portion 98 of the circuitry for the master station 11. When the forward space switch 58b (shown disengaged) is momentarily activated (if the counter portion 101 of the circuitry is not already set at minus 1) the space portion 103 sets the counter portion 101 at a minus 3. This will normally cause the tape to advance for two revolutions of the supply spool instead of one so that two signals are received from the signal portion 100 of the circuitry to reset the counter portion 101 back to a minus 1. If the counter portion 101 is already at a count of minus 1, the spacing portion 103 will set a negative 2 into the counter portion 101 causing the drive mechanism to advance one revolution of the spool until the next signal is received to reset the counter portion 101 to a negative 1. When the back space switch 57b (shown disengaged) is momentarily engaged the spacing portion 103 sets the counting portion 101 of the circuitry to zero, causing the tape to be rewound on the supply spool, and then blocks the first signal from the signal portion 100 from reaching the counting portion 101, while passing the second signal, thereby causing the take-up spool to rewind for two revolutions instead of one before the counting portion 101 is reset to minus 3 to initiate forward playing of the tape.

The portions of the circuitry activated by engaging the check switch 61 (shown disengaged) include the signal portions 95 and 100, the counter portions 96 and 101, and a cross over portion of the circuitry generally enclosed by the dotted line 105 (FIG. 7). After the cue switches 56a and 56b for both of the stations 11 and 12 are engaged, and the check switch 61 is engaged, the circuitry will sequentially play first the segment of the tape at the copy station 12 and then the segment of the tape at the master station 11, sequentially rewind the segments, and then repeat the sequential playing of these segments until the check switch 61 is released. When the check switch 61 is released, the signal and counter portions of the circuitry 95, 96, 100 and 101 return the segments at the master and copy stations 11 and 12 to their positions with the end of the segment at the copy station 12 at its record head 19 and the beginning of the segment at the master station 11 at its playback head 19. During the sequential playing of these segments by engaging the check switch 61 the operator may adjust the segments along the tape by manipulation of either of the knobs 50a or 50b to adjust the continuity between the segments.

The portions of the circuitry employed by engaging the record switch 62 (shown disengaged) normally include the portions of the circuitry engaged by the cue switches 56a and 56b at both of the stations (which cue switches 56a and 56b must normally be engaged when the record switch 62 is activated), an interlock portion 107 of the circuitry enclosed generally by dotted lines, which interlock portion 107 insures that the portions of the circuitry engaged by the cue switches 56a and 56b have properly positioned the ends of the segments before the recording can begin, and a conventional safety portion 108 of the circuitry also enclosed generally by dotted lines. The safety portion 108 includes a normally closed switch 110 which is opened by and insures that a tab is in place on the cassette at the second station 12 which, if it were not, would indicate that the cassette were already recorded and would prevent opening of the switch 110 and thereby prevent the recording function. When the conditions for recording are properly satisfied in the circuit portions 107 and 108 and the record switch 62 is activated, the circuitry will simultaneously start to drive the tapes in both cassettes, copying the recorded material on the cassette at the master station 11 beginning at the beginning of the segment in that tape onto the cassette tape at the copy station 12 beginning at the end of the segment in that cassette.

The device 10 also allows recording of signals from an external source coupled at one of the input jacks 71 or 73 onto a cassette at the copy station 12 at the end of a segment selected at the copy station 12 in the manner described above. In this event, the tape engage mechanism at the master station 11 will be disengaged, thereby causing a switch 112 (FIG. 7, portion 105) to be closed via the bar 22. The closed switch 112 causes a signal in the interlock portion 107 equivalent to that signal given when the tape engage mechanism at the master station 11 is engaged and the beginning of the tape segment at the master station 11 is properly positioned for recording. Thus when the end of the segment at the copy station 12 is properly positioned, the recording can be begun by pushing the record switch 62.

Unless otherwise indicated, all diodes illustrated in FIGS. 7 and 9 are of the type designated IN914.

The commercial designations of the active components used in the embodiment described above are listed below. These components are illustrated in FIGS. 7 and 8 wherein certain of the components have been segmented and the segments illustrated in more than one location with the associated pin numbers for ease of illustration, with the segments all bearing the same component reference numeral:

| Designation | Type | Manufacturer and Model No. |
| --- | --- | --- |
| 121,124,125,129,135 | Nand Gate | National Semiconductor MM74COON |
| 122 | Hex Driver | Sprague Corp. ULN2003A |
| 123,127,128 | D-Flip Flop | National Semiconductor MM74C74N |
| 126 | Hex Schmidt Trigger | National Semiconductor MM74C14N |
| 131,138 | Hex Inverter | National Semiconductor MM74CO4N |
| 86a,86b | Photo-Transistor | Fairchild Semiconductor FPT100 |

We claim:

1. A device for compiling signals from one or more master lengths of recording tape onto a single length of recording tape, said device comprising:

first and second stations, said first station comprising means for playing the signals on a said master tape including a playback head and drive means for driving the master tape in either a forward or reverse direction past said playback head, said second station comprising means for playing the signals on a said single tape including a playback head, means coupled to said means for playing at said first station for recording signals from the master tape at said first station on the single tape at said second station including a record head, and drive means for driving the tape in either a forward or reverse direction past said heads at said second station; and each of said stations further comprising:

means for automatically and repetitively cycling said drive means between forward and reverse to repetitively play a short segment of that tape adjacent the station;

manually actuated means for incrementally changing the short tape segment played by said means for automatically and repetitively cycling to afford selection of a desired beginning point on the master tape and selection of a desired ending point on the single tape; and means for activating said drive means and for activating said means for recording to record signals from the master tape at said first station onto the single tape at said second station with the signal at the desired beginning point on the master tape being recorded at the desired ending point for the single tape.

2. A device according to claim 1, further comprising means for sequentially activating said means for cycling at said first and second stations with the desired beginning point on the master tape played at said first station and the desired ending point on the single tape played at said second station being played at essentially the same time, whereby the operator may check the continuity of said tape segments prior to activating said means for recording.

3. A device according to claim 1, wherein said means at each station for cycling said drive means between forward and reverse comprises means in said device for producing a marking signal corresponding to the passing of each of two spaced locations along the tape past the playback head in either direction, and a control circuit for cycling said drive means between forward and reverse in response to said marking signals; and said means for incrementally changing the segment comprises means for manually changing the timing between said means for producing a marking signal and the movement of said tape to change the segment of tape that passes said playback head between marking signals.

4. A device according to claim 3, adapted for use with magnetic recording tapes wound on a spools, wherein said drive means comprises a shaft having a first end adapted for engagement to rotate with the spools at said station, and each of said means for producing a marking signal comprises a rotating first signal member fixed on said drive shaft and a second signal member mounted for movement around and relative to said rotating signal member, which second signal member is normally in a fixed position and cooperates with said rotating signal member to help produce said marking signals when portions of said signal members are brought into alignment by rotation of said rotating signal member, and which second signal member is manually movable to change the position of said rotating signal member at which said portions are brought into alignment and thereby the locations along said tape passing the recording head when said marking signals are produced.

5. A device according to claim 4, wherein said rotating signal member comprises a housing fixed to the end of said drive shaft opposite said first end and having a cavity coaxial with said shaft and opening on the side of said housing opposite the shaft and a slot extending radially of said axis through the housing defining said portion of said rotating member; each of said means for producing a marking signal further includes a source of illumination within said cavity and means for producing a marking signal upon illumination thereof, and said portion of said second signal member is reflective and aligned to reflect light passing through said slot to said means for producing said signal upon rotation of said slot past said reflective portion.

6. A method for compiling signals from one or more lengths of master recording tape onto a single length of recording tape, said method comprising the steps of:

providing first and second stations, the first station comprising means for playing the recorded signals on the master tape including a playback head and drive means for driving the master tape in either a forward or reverse direction past the playback head, the second station comprising means for playing the signals on the single tape including a playback head, means coupled to the means for playing at the first station for recording signals from the master tape at the first station onto the single tape at the second station including a record head, and drive means for driving the single tape in either a forward or reverse direction past the heads at the second station;

automatically and repetitively cycling the drive means at the first station between forward and reverse to repetitively play a short segment of the master recording tape;

incrementally changing the segment of the master recording tape played during said cycling step to select a desired beginning point;

automatically and repetitively cycling the drive means at the second station between forward and reverse to repetitively play a short segment of the single length of recording tape;

incrementally changing the segment of the single length of recording tape played during said cycling step to select a desired ending point; and activating said drive means and activating said means for recording to record signals from the master tape onto the single length of tape with the signal at the desired beginning point on the master tape being recorded at the desired ending point of the single length of tape.

7. A method according to claim 6, wherein said cycling steps each complete producing a marking signal corresponding to the passage of each of two spaced locations aong the tape past the playback head in either direction, and cycling said drive means between forward and reverse in response to said marking signals; and said incrementally changing step comprises the step of incrementally changing the timing between said means for producing a marking signal and the movement of said tape to change the segment of tape that passes the playback gead between marking signals.

8. A method according to claim 6, further comprising the step of sequentially performing said cycling steps with the desired beginning point for the segment of master tape and the desired ending point for the segment of the single length of tape being played at essentially the same time to check the continuity of said segments prior to said recording step.

* * * * *